US006917940B1

(12) United States Patent
Chen et al.

(10) Patent No.: US 6,917,940 B1
(45) Date of Patent: Jul. 12, 2005

(54) OLAP-BASED CUSTOMER BEHAVIOR PROFILING METHOD AND SYSTEM

(75) Inventors: Qiming Chen, Sunnyvale, CA (US); Umeshwar Dayal, Saratoga, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/523,446

(22) Filed: Mar. 10, 2000

(51) Int. Cl.[7] ............................................. G06F 17/30
(52) U.S. Cl. ........................................ 707/10; 707/102
(58) Field of Search .............................. 707/6, 10, 100, 707/102; 705/1, 4, 35, 38; 706/11, 12; 379/88.19, 189

(56) References Cited

U.S. PATENT DOCUMENTS

| 5,745,654 A | * | 4/1998 | Titan ............................. 706/11 |
| 5,790,645 A | * | 8/1998 | Fawcett et al. ............. 379/189 |
| 5,799,300 A | * | 8/1998 | Agrawal et al. ................ 707/5 |
| 5,809,478 A | * | 9/1998 | Greco et al. .................... 705/4 |
| 5,852,819 A | * | 12/1998 | Beller ............................. 707/1 |
| 5,937,037 A | * | 8/1999 | Kamel et al. ............. 379/88.19 |
| 5,940,818 A | * | 8/1999 | Malloy et al. ............... 707/100 |
| 5,970,482 A | * | 10/1999 | Pham et al. .................... 706/12 |
| 5,978,788 A | * | 11/1999 | Castelli et al. ................. 707/1 |
| 6,018,723 A | * | 1/2000 | Siegel et al. ................... 705/38 |
| 6,119,103 A | * | 9/2000 | Basch et al. ................... 705/35 |
| 6,154,766 A | * | 11/2000 | Yost et al. .................... 707/100 |
| 6,236,978 B1 | * | 5/2001 | Tuzhilin ......................... 705/1 |

OTHER PUBLICATIONS

Q. Chen, U. Dayal, Meichun Hsu, "OLAp–based Scalable Profiling of Customer Behavior", Proc. Of 1st International Conference on Data Warehouseing and Knowledge Discovery(DWK99), 1999, Itlay.*
O. R. Zaiane, M. Xin, and J. Han. Discovering web access patterns and trends by applying OLAP and data mining technology on web logs. In Advances in Digital Libraries, pp. 19–29, Santa Barbara, 1998.*
J. Han, "Towards On–Line Analytical Mining in Large Databases," ACM SIGMOND Record, 27:1, pp. 97–107, 1998.*
Surajit Chaudhuri and Umesh Dayal, An Overview of Data Warehousing and OLAP Technology, ACM SIGMOD Record 26(1), Mar. 1997.*

* cited by examiner

Primary Examiner—Diane D. Mizrani
Assistant Examiner—Yicun Wu

(57) ABSTRACT

An OLAP-based method and system for profiling customer behavior that can be utilized to detect telecommunication fraud. First, call records are received. Next, a calling profile cube (e.g., a multi-customer profile cube) is generated based on the call records. A volume-based calling pattern cube (e.g., a calling pattern cube for each individual customer) is then generated based on the multi-customer profile cube. The volume-based calling pattern cube is then compared with known fraudulent volume-based calling patterns. If the similarities generated by the comparison reaches or exceeds a predetermined threshold, then the particular caller with the calling pattern being analyzed is considered suspicious. In this manner, suspicious calling activity can be detected, and appropriate remedial actions, such as further investigation or the cancellation of telephone services, can be taken.

12 Claims, 4 Drawing Sheets

OLAP-BASED CUSTOMER BEHAVIOR PROFILING METHOD AND SYSTEM

FIELD OF THE INVENTION

The present invention relates generally to data processing and more specifically to an OLAP-based customer behavior profiling method and system.

BACKGROUND OF THE INVENTION

Telecommunication fraud is a major problem that costs the telephone service providers many millions of dollars annually. There are generally two types of telecommunication fraud: fake identity and real identity fraud. In fake identity fraud, the impostor uses another's access code to access telephone services (e.g., local or long distance access). In a real identity fraud, the perpetrator uses a real identity, but fails to pay the telephone service providers for services. When the telephone company stops providing service to a real identity fraud perpetrator, the perpetrator either applies for a new number or switches service providers, thereby continuing to defraud the telephone service providers.

To counteract these problems, telephone service providers currently hire consultants and provide them with past calling records, which typically include all the calling records for a previous year. The consultants then take six months or more to sort through the many millions of records and to generate a report that describes any suspicious activity for the past year. Unfortunately, the prior art tools for fraud detection utilized by the consultants to analyze the records are very limited and employ very crude or coarse threshold detection methods to detect the fraudulent behavior.

For example, one prior art threshold detection method is based solely on the length of the telephone call. When a particular call exceeds a particular length (e.g., 24 hours), the method informs the consultant that the call is probably fraudulent. Another prior art threshold detection method is based on both the length of the call and the time when the call occurred. When a particular call is more than a particular length of time (e.g., 4 hours), and the call occurs in the evening (e.g., after 10PM), then this prior art method classifies the call as "fraudulent."

These current methods suffer from several disadvantages. First, these tools do not have the ability to generate a specific and personalized caller profile and to use that profile to detect suspicious calling activity that corresponds to a unique calling behavior. As noted, only very coarse threshold can be established. Personalized profiles are important because calling behavior that may considered to be abnormal calling behavior (e.g., phone calls in the evening that last more than four hours) for a first caller, who normally makes no calls in the evenings, may be normal activity for a second caller, who only makes calls in the evenings that average between five and six hours. Thus, it is desirable to have a mechanism that can establish a personalized threshold or baseline that differs among different callers thereby accommodating different to callers, who inevitably have different calling behaviors and patterns. Such a mechanism could then determine what is abnormal calling activity as measure to a baseline of that caller's previous calling behavior.

Second, the prior art approaches consume much time. Because of the time needed by the consultants to perform the analysis and generate the report, the impostor or perpetrator of telephone fraud will more than likely have moved onto a different telephone service provider or to new telephone number by the time any fraud has been detected. In addition, there will always be six months to a year or more of unrecoverable profits lost to fraudulent behavior before that behavior is detected, if at all. It is desirable to have a mechanism that reduces the time needed between the fraudulent activity and the detection thereof Third, the prior art methods are also poor at handling the volume of calls. Even if more consultants were hired, and these consultants worked around the clock, they would be unable to handle the sheer volume of calls that are continuously generated. The volume of call data is in the order of millions of call records per day for a particular local geographic area. It is desirable to have a mechanism that can incrementally update an existing profile to reflect information from the new call records.

Furthermore, the prior art methods are limited to analyzing past calling records and are unable to provide up-to-date reports that reflect current call records and trends. In this regard, it is desirable to develop a system that is scaleable (i.e., that can automatically process new records on a periodic basis and generate reports that reflect new information provided by the new records).

Fourth, these prior art methods use volume data, which is difficult to compare across different time periods. For example, the number of calls made in a single month (e.g., January) cannot be compared to the total number of calls made for an entire year (e.g., 1999). Similarly, a weekly measure of the number of calls made by a particular caller makes cannot be compared to a monthly measure of the number of calls made by the same caller. In the example given above, suppose the consultant studies the past six months of call records and determines that it is likely that any caller who makes more than 100 calls for a duration of more than 24 hours in six months is likely to be fraudulent This information is not useful for determining if a caller over a time frame different from six months is perpetrating telephone fraud. In addition, It is desirable instead to have a mechanism that generates values that can be compared easily across different time periods.

Accordingly, there remains a need for a method for generating and using caller profiles to detect telecommunication fraud that overcomes the disadvantages set forth previously.

SUMMARY OF THE INVENTION

The present invention discloses an OLAP-based method and system for profiling customer behavior. In one embodiment, the present invention is applied to telecommunication fraud detection and involves processing call records. In this embodiment, the following steps are performed. First, call records are received. Next, a calling profile cube (e.g., a multi-customer profile cube) is generated based on the call records. A volume-based calling pattern cube (e.g., a calling pattern cube for each individual customer) is then generated based on the multi-customer profile cube. The volume-based calling pattern cube is then compared with known fraudulent volume-based calling patterns. If the similarities generated by the comparison reaches or exceeds a predetermined threshold, then the particular caller with the calling pattern being analyzed is considered suspicious. In this manner, suspicious calling activity can be detected, and appropriate remedial actions, such as further investigation or the cancellation of telephone services, can be taken.

In an alternative embodiment, after the volume-based calling pattern cube (e.g., a calling pattern cube for each individual customer) has been generated, a probability-based calling pattern cube is generated based on the volume-based calling pattern cube. The probability-based calling pattern is then compared with known probability-based fraudulent patterns. If the similarities generated by the comparison reaches or exceeds a predetermined threshold, then the particular caller with the calling pattern being analyzed is considered suspicious. One advantage of the alternative embodiment over the first embodiment described above is that two patterns that cover different time periods can be compared and analyzed.

DETAILED DESCRIPTION

Figure 1:
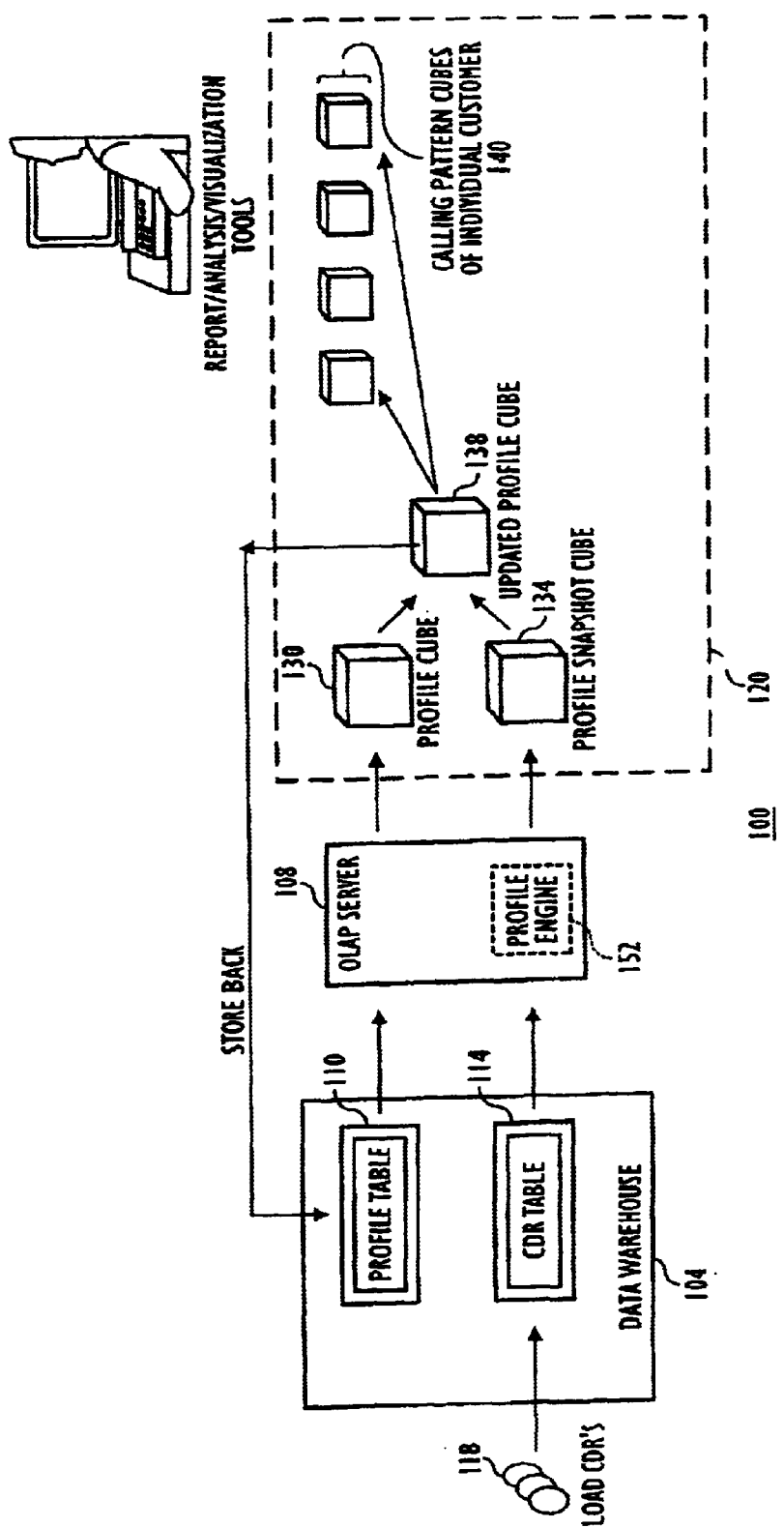
FIG. 1 is a block diagram illustrating a data processing system configured in accordance with one embodiment of the present invention.

The subject invention will be described with reference to numerous details set forth below, and the accompanying drawings will illustrate the invention. The following description and the drawings are illustrative of the invention and are not to be construed as limiting the invention. Numerous specific details are described to provide a thorough understanding of the present invention. However, in certain instances, well-known or conventional details are not described in order not to obscure unnecessarily the present invention in detail. In the drawings, the same element is labeled with the same reference numeral.

One aspect of the present invention is the use of an OLAP-based profile engine as a scalable computation engine to compute, maintain and utilize customer behavior profiles. In other words, the present invention provides an OLAP-based system and method for customer behavior profiling and pattern analysis that powerfully extends the limited capabilities of traditional OLAP tools that were generally directed only to query and analysis of data.

Another aspect of the present invention is to generate personalized or group-based thresholds that are more precise and useful than generalized thresholds of the prior art. For example, by generating personalized calling behavior profiles, the present invention can determine that calls by John for four hours are considered usual, but calls by Jane for two hours are considered unusual.

Yet another aspect of the present invention is the use of an OLAP-based method and system to detect telephone fraud by comparing a known fraudulent profile to customer profile. For example, in one embodiment, the present invention profiles each new customer's calling behavior and compares these profiles against known fraudulent profiles to detect fraud.

According to yet another aspect of the present invention, profiles and calling patterns are represented as multi-level and multidimensional cubes.

In one embodiment of the present invention, profiles and calling patterns are based on the probability distribution of call volumes. The present invention can utilize an OLAP-based profile engine to compute these probability distributions.

Figure 2:
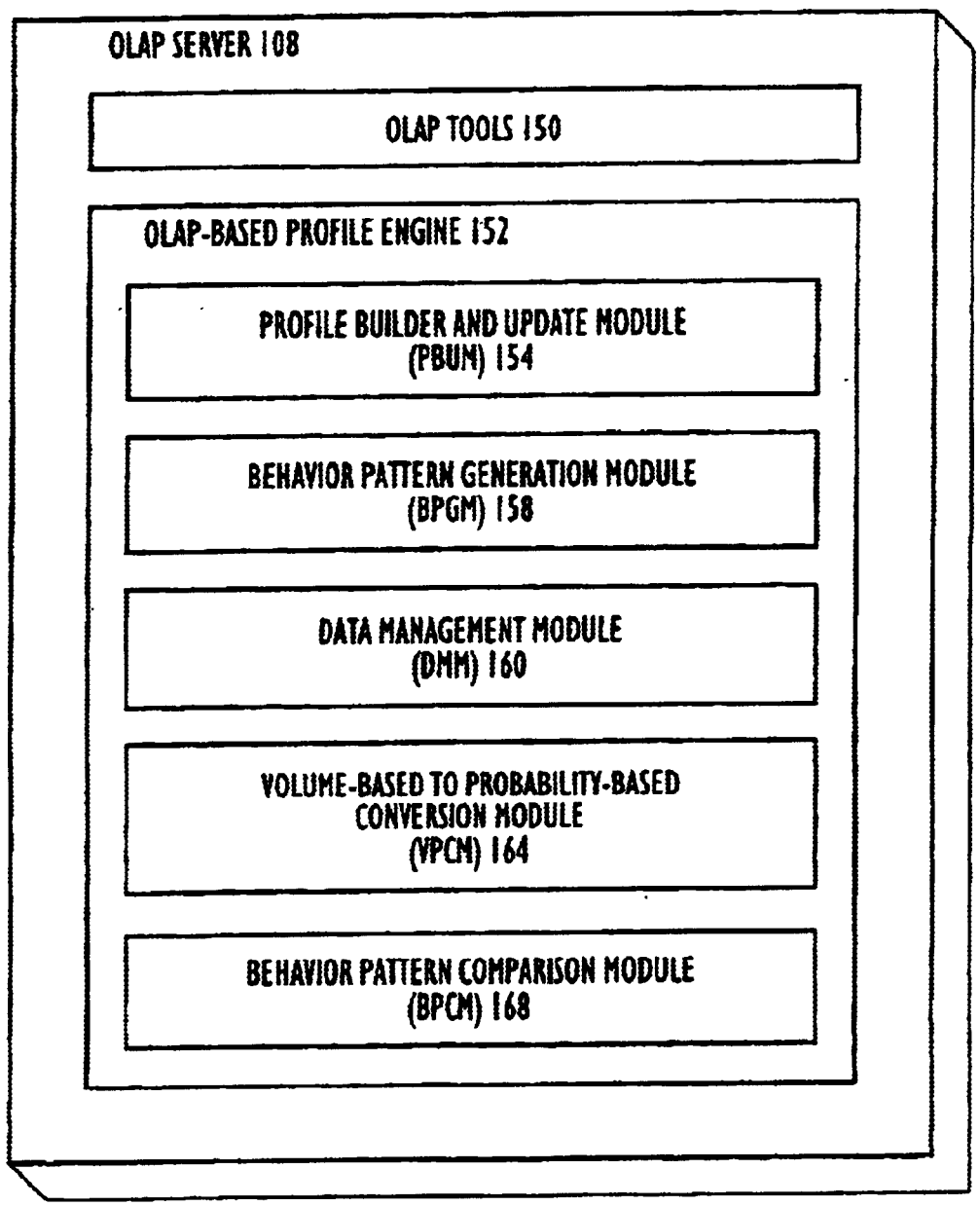
FIG. 2 is block diagram illustrating in greater detail the OLAP server of FIG. 1.
Figure 3:
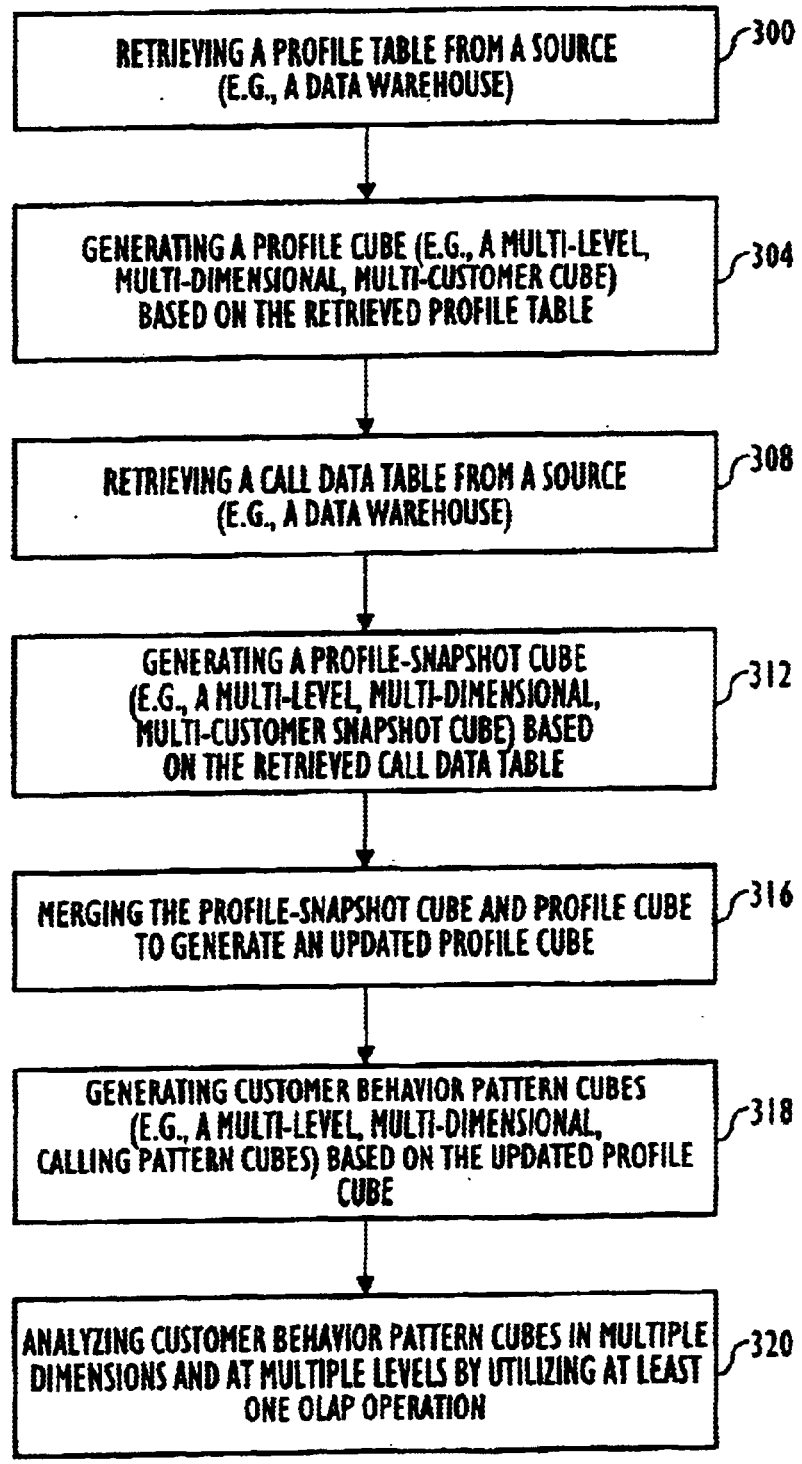
FIG. 3 is a flowchart illustrating the operation of the OLAP-based profile engine of FIG. 2 according to one embodiment of the present invention.

The architecture of a data processing system configured in accordance with one embodiment of the present invention is illustrated in FIG. 1, and an OLAP-based profiling engine that is configured in accordance with one embodiment of the present invention is illustrated in FIG. 2. A flowchart of the method of generating and using calling patterns for fraud detection is illustrated in FIG. 3. Profiling with fixed values and probability distributions are described with reference to TABLE 1 and TABLE 2, respectively. Volume and probability based calling patterns are described with reference to FIG. 4.

OLAP-Based Data Processing System 100

One substantial challenge for the prior art approaches to caller fraud detection is how to process the sheer volume of call data in order to generate caller profiles and update them. In order to create and update customer behavior profiles, hundreds of millions of call records must be processed everyday.

The present invention overcomes this challenge by providing an OLAP-based architecture or framework that is both scalable and maintainable to support customer behavior profiling. One application of the OLAP-based architecture of the present invention is caller behavior profiling for telecommunication fraud detection.

FIG. 1 is a block diagram illustrating a data processing system 100 configured in accordance with one embodiment of the present invention. The data processing system 100 includes a data warehouse 104, an OLAP server 108 that has a profile engine 152, and a multi-dimensional database 120. The present invention powerfully extends the function of a traditional OLAP server 108 by providing the profile engine 152. In the preferred embodiment, the profile Gengine 152 of the present invention is an OLAP-based profile engine. As will be described in greater detail hereinafter with reference to FIG. 2, the OLAP-based profile engine 152 of the present invention provides a scalable computation engine for delivering powerful solutions for customer behavior profiling, pattern generation, analysis and comparison, and data management.

First, profiling engine 152 builds and incrementally updates customer calling behavior profiles by mining call records 118 flowing into the data-warehouse 104 on a periodic basis. Second, the profiling engine 152 maintains profiles by staging data between the data-warehouse 104 and an OLAP multidimensional database 120. For example, a profile cube 130, a profile snapshot cube 134, and an updated profile cube 138 (which are part of the OLAP multidimensional database 120) can be generated based on data received from the profile table 110 and the call records table 114. The profile cube 130, the profile snapshot cube 134, and the updated profile cube 138 are described in greater detail hereinafter. Third, the profiling engine 152 derives multi-level and multidimensional customer calling patterns (e.g., calling pattern cubes 140 of individual customers) from the updated profile cube 138 for fraud detection analysis. Fourth, the profiling engine 152 compares the calling patterns with known fraudulent patterns for fraud detection purposes.

The data warehouse 104 includes a profile table 110 for the storing customer profile information and a call record table 114 for storing the call data records (CDRs). For example, call data records (CDRs) 118 may be loaded into the call record table 114 on a periodic basis (e.g., on a daily basis).

In one embodiment, the data warehouse 104 can be implemented with an Oracle-8 based telecommunication data-warehouse, and the OLAP server 108 and multidimensional database 120 can be implemented with an Oracle Express multidimensional OLAP server. The profile engine 152 is preferably implemented by OLAP programming (i.e., by a program written in a scripting language provided by the OLAP server 108).

FIG. 2 is block diagram illustrating in greater detail the OLAP server 108 of FIG. 1. The OLAP server 108 includes traditional OLAP analysis and visualization tools 150 that are typically used for query and analysis of corporate data, such as sales, marketing, financial, manufacturing, or human resources data. The OLAP server 108 also includes the profile engine 152, which in accordance with one embodiment of the present invention, is an OLAP-based scalable computation engine for creating profiles, updating profiles, deriving calling patterns from profiles, and analyzing and comparing the calling patterns.

The profile engine 152 includes a profile builder and update module (PBUM) 154, a behavior pattern generation module (BPGM) 158, a data management module (DMM) 160, a volume-based to probability-based conversion module (VPCM) 164, and a behavior pattern comparison module (BPCM) 168.

The profile builder and update module (PBUM) 154 builds and updates customer calling profiles by incrementally mining the CDRs that flow periodically into the data-warehouse 104. Mining refers generally to the well-known process of converting data in a first format (e.g., a record format suited for a relational database) into a second format (e.g., a multi-dimensional cube format suited for a multi-dimensional database).

The behavior pattern generation module (BPGM) 158 derives customer behavior patterns (e.g., calling pattern cubes) from the customer profiles. The volume-based to probability-based conversion module (VPCM) 164 converts volume-based calling patterns into probability based calling patterns. The behavior pattern comparison module (BPCM) 168 analyzes the calling patterns and compares the calling patterns with personalized profiles or known fraudulent patterns to detect telephone fraud. For example, the BPCM 168 can determine whether a particular customer calling pattern matches with a predetermined profile that is known to be fraudulent and automatically generate an alert if there is a match.

Below is the Oracle-8 schema of the profile table called "Profile", where "pc" is the number of calls dimensioned by other attributes.

```
// Oracle8 table schema
CREATE TABLE Profile
{
    caller      VARCHAR2(10)    NOT NULL,
    callee      VARCHAR2(10)    NOT NULL,
    duration    CHAR(1)         NOT NULL,
    time        CHAR(1)         NOT NULL,
    dow         char(1)         NOT NULL,
    pc          INTEGER
}
    STORAGE . . .;
```

The corresponding profile cube (PC) 130 can be defined in Oracle Express as follows:
//oracle Express cube definition
define PC variable int <sparse <duration time dow callee caller>> inplace
where dow stands for day_of_week (e.g. Monday, . . . , Sunday).

It can be seen that the attributes of the profile table 110 has one-to-one correspondence to the dimensions (including the output dimension) of the profile cube 130. The present invention provides this arrangement in order to simplify data staging operations.

Referring to FIG. 3, the steps performed by the profile engine 152 illustrated in FIGS. 1 and 2 are now described. In step 300, the profile builder and update module 154 retrieves a profile table (e.g., profile table 110) from a source (e.g., the data warehouse 104) and provided to a profiling engine 152. In step 304, the PBGM 154 uses the retrieved profile table 110 to automatically generate a profile cube (e.g., profile cube 130). The profile cube 130 can be a multi-level, multi-dimensional, and multi-customer cube and can be generated by utilizing OLAP programming. In step 308, the PBGM 154 retrieves a call data table (e.g., call data table 114). In step 312, the PBGM 154 uses the retrieved call data table to create a profile-snapshot cube (e.g., profile-snapshot cube 134). The profile snapshot cube 134 can be a multi-level, multi-dimensional, and multi-customer cube and can be generated by utilizing OLAP programming.

In step 316, the PBGM 154 merges the profile-snapshot cube 134 and the profile cube 130 to generate an updated profile cube (e.g., updated profile cube 138). Since profile-snapshot cubes 134 and profile cubes 130 have the same dimensions, with cell values representing number of calls, the profile-snapshot cube 134 and a profile cube, 130 covering the same group of callers, can be easily merged by addition. In step 318, the BPGM 158 generates (e.g., derives) a plurality of individual customer based calling pattern cubes (e.g., calling pattern cubes 140) from the updated profile cube 138. Various kinds of pattern cubes can defined. These pattern cubes 140 can be multilevel and multi-dimensional and can be generated by utilizing OLAP programming. By rolling up these cubes, multilevel calling patterns can be supported. An exemplary method for generating these calling pattern cubes 140 is described in greater detail herein after.

In step 320, the BPCM 168 analyzes the individual calling patterns in multiple dimensions and at multiple levels. For example, for fraud detection purposes, the BPCM 168 can compare the current calling pattern of a customer for a recent period of time to a baseline established by the calling pattern of the customer during a fixed, predetermined time in the past (e.g., typical past usage that is personalized). When the differences between these two patterns that reach or exceed a predetermined threshold, the BPCM 168 can automatically generate an alert. Alternatively, a known fraudulent calling pattern can be compared to a plurality of customer patterns. If there is a match, as defined by a predetermined standard, the BPCM 168 can automatically generate an alert.

Data Management

The data management module 160 handles data staging between the data-warehouse 104 and an OLAP multidimensional database 120. The following steps are repeated periodically (e.g. on a daily basis). First, call data records 118 are loaded into the call data table 114 in the data-warehouse 104, and then loaded to the profiling engine 152 to generate the profile-snapshot cube 134 that is multi-customer oriented. Second, the profile cube 130 that covers the same set of customers is retrieved from the data-warehouse 104. The step of retrieving the profile cube 130 can occur in parallel with the step of generating the profile-snapshot cube 134. Third, the profile cube 130 is updated to generate the updated profile cube 138 by merging the profile cube 130 with the profile-snapshot cube 134. The updated profile cube 138 can be stored back to the profile table 110 in the data-warehouse 114. The frequency of data-exchange between the data-warehouse 104 and the OLAP server 108 can be controlled by predetermined data staging policies. The staging polices can depend on factors, such as, (1) the amount of data flowing into the data warehouse 104; (2) the amount of storage space available in both the data warehouse and the multi-dimensional database 120, and (3) other application-specific criteria.

In order to reduce data redundancy and query cost, it is preferable for the present invention to maintain minimal data in the profile tables 110 in the data-warehouse 104. Accordingly, the present invention stores multiple customers calling information in a single profile table 110 or profile cube 130 without separating information for outgoing calls and incoming calls. The present invention ensures that the relational schema of the profile table 110 directly corresponds to the base level of the profile cube 130. In addition, the present invention does not maintain derivable values at higher levels in the data-warehouse 104.

Calling Cubes

In one embodiment, the present invention generates and uses two types of calling cubes: (1) multi-customer based profile cubes (e.g., updated profile cube 138), and (2) single customer based calling pattern cubes 140.

Profile Cubes

A profile cube (e.g., profile cube 130) has the same underlying dimensions as a profile-snapshot cube (e.g., profile snapshot cube 134). In addition, the profile cubes and profile-snapshot cubes both contain profiling information of multiple customers in direct correspondence with the relational tables (e.g., tables 110 and 114) in the data-warehouse 104. In one embodiment, the PBUM 154 defines the profile cube and the profile-snapshot cube as follows by utilizing the Oracle Express language:

define PC variable int <sparse <duration time dow callee caller>> inplace
  define PCS variable int <sparse <duration time dow callee caller>> inplace where callee is the telephone number of the person being called; caller is the telephone number of the person placing the call; dimension time has values representing time-bins (e.g., 'morning', 'afternoon', and 'evening'); dimension duration has values representing duration-bins (e.g., 'short', 'medium', and 'long'); and dimension dow has values representing days of week (e.g., 'MON', . . . 'SUN').

It is noted that the use of keyword "sparse" in the above definitions instructs Oracle Express to create a composite dimension <duration time dow callee caller>, in order to handle sparseness, particularly between calling and called numbers, in an efficient way. A composite dimension is a list of dimension-value combinations. A combination is an index into one or more sparse data cubes. The present invention uses a composite dimension to store sparse data in a compact form similar to relation tuples.

The PBUM 154 populates the profile-snapshot cube PCS by utilizing a mapping process, which is referred to herein as "binning." Specifically, the PBUM 154 maps the values in the fields of a call data record contains to each dimension of the PCS cube. For example, '8am' is mapped to time-bin 'morning', 5 minutes is mapped to duration-bin 'short'. A call made at 8am and lasting 5 minutes falls into the cell corresponding to time='morning' and duration='short'.

The PBUM 154 also retrieves information from the profile table 110 of the data warehouse 104 and represents the retrieved information as profile cube PC and merges the profile cube PC with the PCS cube to generate an updated PC cube, which can be stored back to the data warehouse 104 by the DMM 160. In Oracle Express, the merge of PC and PCS may be expressed as $$PC=PC+PCS$$

In this manner, the PBUM 154 updates the customer profiles incrementally as each new batch of call data records flows into the data-warehouse.

Hierarchical Dimensions for Multilevel Pattern Representation

A hierarchical dimension D contains values at different levels of abstraction. The following is associated with the hierarchical dimension D: 1) dimension DL that describes the levels of the hierarchical dimension D; 2) a relation DL_D that maps each value of the hierarchical dimension D to the appropriate level; and 3) a relation D_D that maps each value of the hierarchical dimension D to its parent value (i.e., the value at the immediate upper level). Let D be an underlying dimension of a numerical cube C, such as a volume-based calling pattern cube. D, together with DL, DL_D and D_D, fully specify a dimension hierarchy. They provide sufficient information to rollup cube C along dimension D, (i.e., to calculate the total of cube data at the upper levels using the corresponding lower-level data). As can be appreciated, the cube C can be rolled up along multiple underlying dimensions.

The BPGM 158 generates calling pattern cubes based on the profile cubes. These calling pattern cubes are used to represent the calling behavior of individual customers. The BPGM 158 may employ the dimensions described herein below as hierarchical dimensions in order to represent the calling behavior of individuals at multiple levels. It is noted that the calling pattern cubes can be rolled up along these hierarchical dimensions.

Dow Hierarchical Dimension

In accordance with one embodiment of the present invention, the Day of Week (dow) hierarchy includes the following objects:

dow(day of week): dimension with values 'MON', . . . 'SUN' at the lowest level (dd level), 'wkday', 'wkend' at a higher level (ww level), and 'week' at the top level ('week' level);

dowLevel: dimension with values 'dd', 'ww', 'week';

dow_dow: relation (dow, dow) for mapping each value to its parent value, e.g.,
    dow_dow(dow 'MON')='wkday'
    . . .
    dow_dow(dow 'SAT')='wkend'
    dow_dow(dow 'wkday')='week'
    dow_dow(dow 'wkend')='week'
  dow_dow(dow 'week')=NA;

dowLevel_dow: relation (dow, dowLevel) for mapping each value to its level, e.g.,
    dowLevel_dow(dow 'MON')='dd'
    . . .
    dowLevel_dow(dow 'wkday')='ww'
    dowLevel_dow(dow 'wkend')='ww'
    dowLevel_dow(dow 'week')='week'.

Time Hierarchical Dimension

In accordance with one embodiment of the present invention, the time hierarchy includes the following objects:

time: dimension with values 'night', 'morning', 'afternoon' and 'evening' at 'time_bin' level (bottom-level), and 'allday' at the 'time_all' level (top-level);

timeLevel: dimension with values 'time_bin' and time_all';

time_time: relation (time, time) for mapping each value to its parent value, e.g.,
   time_time(time 'morning')='allday'
   . . .
   time_time(time 'allday')=NA;
timeLevel_time: relation (time, timeLevel) for mapping each value to its level, e.g.,
   timeLevel_time (time 'morning')='time_bin'
   timeLevel_time(time 'allday')=time_all'.
Duration Hierarchical Dimension In accordance with one embodiment of the present invention, the duration hierarchy includes the following objects.

duration: dimension with values 'short', 'medium', 'long' at 'dur_bin' level (bottom-level, and 'all' and 'dur_all' level (top-level)
durLevel: dimension with values 'dur_bin' and 'dur_all'
dur_dur: relation (duration, duration) for mapping each value to its parent value, e.g.,
   dur_dur(duration 'short')='all'
   . . .
   dur_dur(duration 'all')=NA
durLevel_dur: relation (duration, durLevel) for mapping each value to its level, e.g.,
   durLevel_dur(duration 'short') ='dur_bin'
   . . .
   durLevel_dur(duration 'all')='dur_all'

When the present invention performs profile storage, combination and updating, only the bottom levels are involved. Thus, rolling up profile cubes, such as PC, is unnecessary. It is noted that the present invention applies the roll up operation to calling pattern cubes for analysis purposes.

Volume Based Calling Patterns

In the preferred embodiment of the present invention, a calling pattern cube is associated with a single customer for representing the individual calling behavior of that customer. Since the calling behavior of a customer can be viewed from different aspects, the present invention can define different kinds of calling pattern cubes. These cubes are commonly dimensioned by time, duration and dow (day of week). Cubes that are related to outgoing calls are commonly dimensioned by callee, and cubes that are related to incoming calls are commonly dimensioned by caller. The cell values of these cubes represent the number of calls, the probability distributions, etc. Calling pattern cubes, several examples of which are described below, are derived from profile cubes and then rolled up.

Cube CB.o represents the outgoing calling behavior of a customer. In Oracle Express that is defined by the following: define CB.o variable int <sparse<duration time dow callee>> inplace.

Similarly, cube CB.d representing incoming calling behavior is defined by the following: define CB.d variable int <sparse <duration time dow caller>> inplace.

The cell values of these cubes are the number of calls falling into the given 'slot' of time, duration, day of week, etc. When generated, CB.o and CB.d are rolled up along dimensions duration, time and dow. Therefore, CB.o (duration 'short', time 'morning', dow 'MON') measures the number of short-duration calls this customer made to each callee (dimensioned by callee) on Monday mornings during the profiling interval. Similarly, CB.o(duration 'all', time 'allday', dow 'week') measures the number of calls this customer made to each callee (total calls dimensioned by callee) during the profiling interval.

A Method for Deriving a Calling Pattern Cube

An exemplary method that can be utilized by the BPGM 158 to generate a calling pattern cube CB.o from a profile cube PC, defined above, will now be described. It is noted that other calling pattern cubes can be generated in a similar way.

Cube PC is pre-populated using the data retrieved from database table Profile and possibly combined with cube PCS that is generated from loading call data. With the following algorithm, the calling pattern cube, CB.o, is populated for a given customer as specified by parameter customer_callID.

```
define genCB (customer_callID text)
{
    -   if customer_callID is not a value of caller
        then return
    -   remove old cells of CB.o by
        limit dimensions duration, time, dow and callee to all their
        values CB.o = NA
    -   limit dimensions duration, time, dow to their bottom level
        values
    -   limit dimension caller to the given customer by
        limit caller to customer_callID
    -   limit dimension callee to those being called by the given
        customer, as limit callee to any(PC > 0, callee)
    -   form a subcube of PC by selecting only the data related to the
        given customer (the current value of caller dimension), then
        transfer (unravel) its cell values to cube CB.o, as
        CB.o = unravel(total(PC, duration time dow callee)
    -   rollup CB.o by
        limit duration, time, dow to all their values
        rollup CB.o over duration using dur_dur
        rollup CB.o over time using time_time
        rollup CB.o over dow using dow_dow
}
```

Behavior Profiling with Probability Distribution

For customer behavior profiling, the present invention first specifies which features (i.e., dimensions) are relevant. In one embodiment, in connection with calling behavior profiling, the present invention utilizes the following features for a customer's outgoing and incoming calls: the phone-numbers, volume (i.e., the number of calls), duration of the call, time of day the call was made, and day of week the call was made. Second, the present invention also specifies the granularity of each feature. For example, the time of day feature can be represented by the time-bins 'morning', 'afternoon', 'evening' or 'night'. Similarly, the duration feature can be represented by duration bins, such as 'short', 'medium', and 'long.' Each bin can be defined and set to predetermined values. In one embodiment, all calls that have a duration shorter than 20 minutes are placed into the 'short' bin. Also, all calls that have a duration between 20 minutes and 60 minutes are placed into the 'medium' bin, and all calls that have a duration longer than 60 minutes are placed into the 'long' bin. Third, the present invention specifies a profiling interval, which in a non-limiting example can be 3 months, and the periodicity of the profiles, which in a non-limiting example can be weekly. The profiling interval is that time interval over which the customer profiles are constructed, and the periodicity of the profiles is how often the customer profile is summarized. In this example, the customer's profile is a weekly summarization of his calling behavior during the profiling interval.

Based on the profiled information, the present invention derives calling patterns of individual customers. The present invention can generate the following three kinds of calling patterns. The first type of calling pattern is a fixed-value based calling pattern. A fixed-value based calling pattern represents a customer's calling behavior with fixed values showing his "average" behavior. TABLE 1 illustrates a profile with a simple, fixed values. This profile describes the calling pattern from a first telephone number to a second telephone number during "morning", "afternoon", and "evening" periods. On an average, calls are of a medium duration during the morning, of a short duration during the afternoon, and of a long duration during the evenings.

TABLE 1

| Morning | Afternoon | Evening |
| --- | --- | --- |
| Medium | Short | Long |

Figure 4:
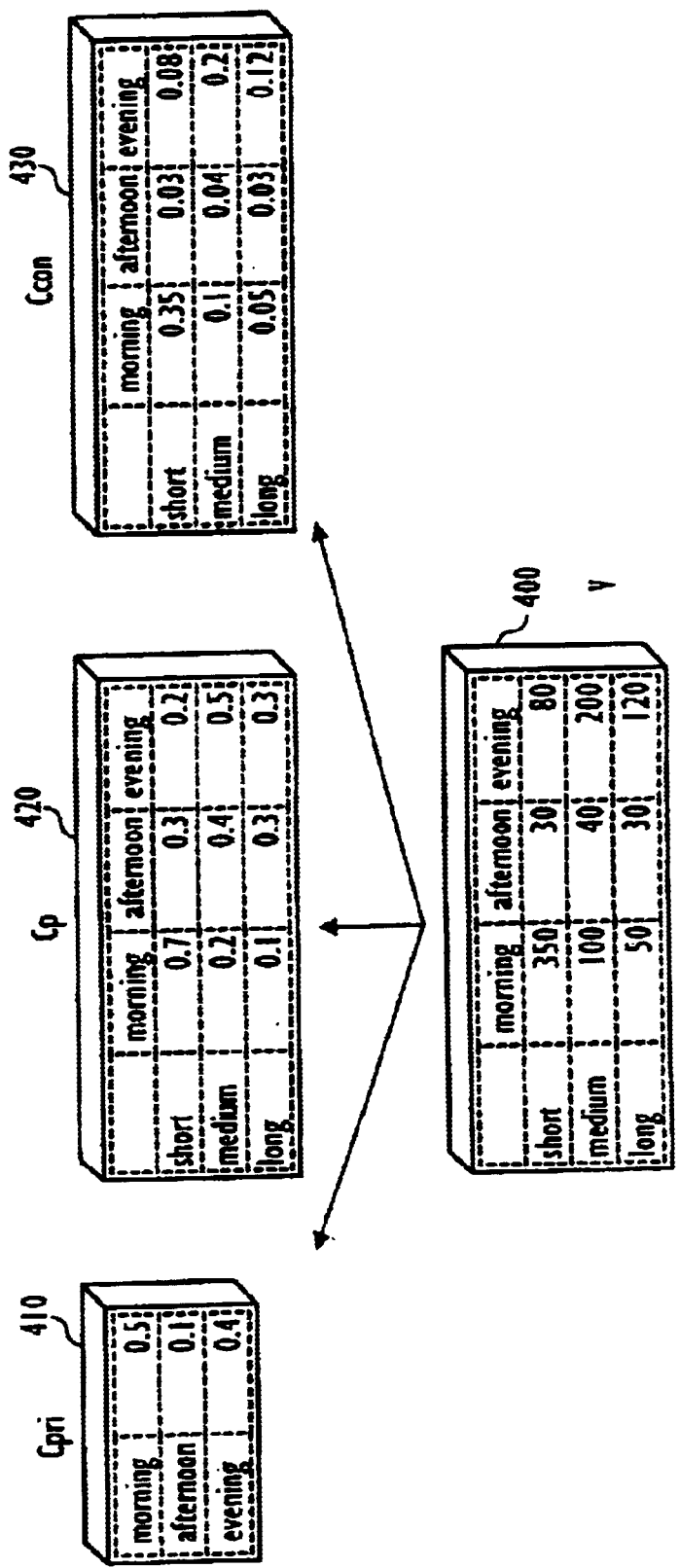
FIG. 4 illustrates exemplary volume and probability based calling patterns that can be generated by the profile engine of the present invention.

The second type of calling pattern is a volume-value based calling pattern. A volume based calling pattern summarizes a customer's calling behavior by counting the number of calls of different duration in different time-bins. Referring to FIG. 4, a volume based calling profile 400 describes the calling pattern from a first telephone number to a second telephone number. During the profiling period in the mornings, there were 350 calls of a short duration, 100 calls of a medium duration, and 50 calls of a long duration. During the profiling period in the afternoons, there were 30 calls of a short duration, 40 calls of a medium duration, and 30 calls of a long duration. During the profiling period in the evenings, there were 80 calls of a short duration, 200 calls of a medium duration, and 120 calls of a long duration.

The third type of calling pattern is a probability distribution based calling pattern. A probability distribution based calling pattern represents a customer's calling behavior with probability distributions. TABLE 2 illustrates a profile with probability distribution values. Specifically, the profile describes the calling pattern or behavior from a first telephone number to a second telephone number in terms of probability values. For example, in the mornings, 10% of the calls were long, 20% of the calls were medium, and 70% of the calls were short. In the afternoons, 30% of the calls were long, 40% of the calls were medium, and 30% of the calls were short. In the evenings, 30% of the calls were long, 50% of the calls were medium, and 20% of the calls were short.

TABLE 2

| | Morning | Afternoon | Evening |
| --- | --- | --- | --- |
| Short | 0.7 | 0.3 | 0.2 |
| Medium | 0.2 | 0.4 | 0.5 |
| Long | 0.1 | 0.3 | 0.3 |

The VPCM 164 of the present invention uses volume-based calling patterns as an intermediate step to derive probability-based calling patterns. Preferably, the present invention uses the probability distribution based calling patterns for detecting fraud for several reasons. First, probability distribution based calling patterns provide more fine-grained representation of dynamic behavior than fixed value based ones. Second, probability distribution based calling patterns also allow calling patterns that correspond to different lengths of profiling interval to be compared. For the threshold based fraud detection application, a long duration call may be noticed before reaching an absolute threshold, and monitored closer and closer as the probability of fraud becomes higher and higher. Third, probability distribution based calling patterns also provide more details of individual behavior that are not seen in fixed-value based calling patterns.

Computing Probability Distribution based Calling Patterns using OLAP

The present invention represents profiles and calling patterns as cubes. A cube has a set of underlying dimensions, and each cell of the cube is identified by one value from each of these dimensions. The set of values of a dimension D, called the domain of D, may be limited (by the OLAP limit operation) to a subset A sub-cube (slice or dice) can be derived from a cube C by dimensioning C by a subset of its dimensions, and/or by limiting the value sets of these dimensions.

As mentioned above, the profile of a customer can be a weekly summarization of his activities in the profiling period. In the preferred embodiment of the present invention, the information for profiling multiple customers' calling behavior are grouped into a single profile cube with dimensions <duration, time, dow, callee, caller>, where dow stands for day_of_week (e.g. Monday, . . . , Sunday), callee and caller are calling and called phone numbers. The value of a cell in a profiling cube measures the volume (i.e., the number of calls) made in the corresponding duration-bin, time-bin in a day, and day of week during the profiling period. In this way a profile cube records multiple customers outgoing and incoming calls week by week From such a multi-customer profile cube, the present invention derives or generates calling pattern cubes of individual customers. The calling pattern cubes of individual customers have similar dimensions to the profile cubes except that a calling pattern cube for outgoing calls is not dimensioned by caller, and a calling pattern cube for incoming calls is not dimensioned by callee because they pertain to a single customer.

The size of each profile cube may be controlled by partitioning the customers represented in a profile cube by area and by limiting the profiling period. The present invention can generate multiple calling pattern cubes to represent a customer's calling behavior from different aspects. For example, some calling pattern cubes representing probability-based information can be derived from intermediate calling pattern cubes representing volume-based information FIG. 4 illustrates how calling pattern cubes representing probability-based information can be derived from intermediate calling pattern cubes representing volume-based information. A volume-based cube (V) 400 for a single customer is derived from the above profile cube by totaling outgoing calls over days of week. The volume cube (V) 400 holds the count of calls during the profiling period dimensioned by <time, duration, callee>, where dimension time has values 'morning', 'evening', etc.; duration has values 'short', 'long', etc.; and dimension callee contains the called phone numbers. A cell in the volume cube 400 is identified by one value from each of these dimensions. The value in a cell identified by duration='short', time='morning', and callee+ '4089194444' is the number of calls made from this customer to '4089194444' in the mornings (e.g., from 8–12AM) that are 'short' (e.g., calls less than 20 minutes) during the profiling period.

Based on the volume cube 400, the VPCM 164 can generate, among other, the following different probability cubes:

$C_{prt}$410 for the prior probability of time-bin of calls with respect to each callee, that is dimensioned by <time, callee>, and indicates the percentage of calls made in 'morning', 'afternoon', 'evening' and 'night', respectively.

$C_p$420 for the conditional probability of call duration-bin given time-bin of calls with respect to each callee, that is dimensioned by <time, duration, callee>, indicates the percentage of calls that are 'long', 'medium' and 'short' respectively, given the time-bin.

$C_{con}$ 430 for the probabilistic consequence of the above (i.e., the probability of calls in every cell crossing) dimensioned by <time, duration, callee>over the total calls.

It is noted that all the above probability cubes, $C_{pri}$, $C_p$, and $C_{con}$, can be derived by the VPCM 164 based on the volume cube V by using OLAP operations. For example, in the Oracle Express OLAP language, these are expressed as $C_{pri}$=total(V, time, callee)/total(V, callee)

$C_p$=(V/$C_{pri}$)/total(V, callee)

$C_{con}$=V/total(V, callee)

In the above expressions, total is an OLAP operation on cubes with numerical cell values. While total(V) returns the total of the cell values of V, total(V, callee) returns such a total dimensioned by callee, total(V, time, callee) returns such a total dimensioned by time and callee. In fact, a dimensioned total represents a cube. The arithmetic operations on cubes, such as '/' used above, are computed cell-wise.

In view of the foregoing, the data management module 160 preferably makes only the volume cubes persistent data-warehouse objects since the probability cubes can be derived and generated based on the volume cubes. In the other words, only the volume-based information needs to be profiled by the profile builder and update module 154. Calling patterns, either based on volume or probability, can be derived by the customer behavior pattern generation module 158.

Cubes Representing Probability Distribution based Calling Patterns

The Volume-based to Probability-based Conversion Module 164 derives or generates cubes representing probability distribution-based calling patterns from volume-based pattern cubes. For example, the Volume-based to Probability-based Conversion Module 164 can derive the following two kinds of such probability distribution-based pattern cubes: (1) "Probability Distribution on All Calls" Cube, and (2) "Probability Distribution on Calls to Each Callee" Cube, which are described herein below. Although only two types of probability-based pattern cubes are described, it is noted that various other types of probability-based pattern cubes can be derived by the Volume-based to Probability-based Conversion Module 164 depending on the specific requirements of a particular application.

Probability Distribution on All Calls

Cube P_CB.o for a customer represents the dimensioned probability distribution of outgoing calls over all the outgoing calls made by this customer, and can be derived from CB.o by the following:

define P_CB.o formula decimal <duration time dow callee>

EQ (CB.o/total(CB.o(duration 'all', 'allday', dow 'week')))

where total(CB.o(duration 'all', 'allday', dow 'week')) is the total calls this customer made to all callees. Since CB.o has already been rolled up, its top-level value can be utilized. The value of a cell is the above probability corresponding to the underlying dimension values.

Probability Distribution on Calls to Each Callee

Cube P1_CB.o is dimensioned by duration, . . . and callee, and represents the probability distribution of a customer's outgoing calls over his total calls to the corresponding callee, and is also derived from CB.o as specified by the following:

define P1_CB.o formula decimal <duration time dow callee>

EQ (CB.o/total(CB.o(duration 'all', 'allday', dow 'week'), callee)), where total(CB.o(duration 'all', 'alday', dow 'week')), callee) is the total calls this customer made to each callee (dimensioned by callee). The value of a cell is the above probability corresponding to the underlying dimension values. Calling pattern cubes for incoming calls can be defined similarly.

Calling Pattern Similarity Comparison

The behavior pattern comparison module 168 compares the generated calling patterns with predetermined patterns to detect a match. This pattern comparison is important for many applications, such as caller fraud detection. Since the similarity of customer behavior can be represented from different angles, the present invention preferably compares calling patterns that are derived from customer calling behavior profiles instead of comparing the profiles directly. For example, some calling patterns can be similar in the volume of calls to the same set of callees, while other calling patterns can be similar in the time of these calls, such as late night calls. Accordingly, the present invention provides an OLAP-based architecture for comparing calling patterns along multiple dimensions and at multiple levels in the dimension hierarchy.

It is noted that similarity of volume-based calling patterns is meaningful only when the patterns cover the same time span. In this regard, the present invention preferably measures the similarity of probability-based calling patterns so that patterns that cover different time spans can be compared meaningfully. For example, the present invention can be utilized to compare a predetermined calling pattern (e.g., a known fraudulent pattern) with an ongoing pattern in real-time.

The foregoing description has provided examples of the present invention. One example has been directed to telecommunication fraud. It will be appreciated that various modifications and changes may be made thereto without departing from the broader spirit and scope of the invention as set forth in the appended claims. For example, the method of generating, updating, and comparing the customer profiles of the present invention can be applied to other areas, such as targeted marketing, targeted promotions, and general fraud detection. In applications where there is a very large collection of transaction data, the present invention can be utilized to generate customer behavior profiles, extract patterns of the activities of the customer, and provide guidelines as to how to meet or otherwise service the needs of the customers.

What is claimed is:

1. A method for detecting telecommunication fraud performed in a data procesing system having a data warehouse and an OLAP server, the method comprising:

retrieving a plurality of call records from the data warehouse;

generating a calling profile cube based on the call record; wherein the calling profile cube includes information on multipe customers;

generating a volume-based calling pattern cube for each individual customer based on the multi-customer calling profile cube;

comparing the volume-based calling pattern cube for each customer to a predetermined fraudulent volume-based calling pattern; and when the volume-based calling pattern cube is in a first predetermined relationship with predetermined fraudulent volume-based calling pattern, performing a first action, wherein said data warehouse has a call table and a profile table and wherein the step of generating a calling profile cube based on the records further comprises the steps of:

retrieving records from the call table and based thereon generating a snapshot cube representing the records from the call table, said snapshot cube having predetermined dimensions;

retrieving records from the profile table and based thereon generating a profile cube representing the records from the profile table, said profile cube having predetermined dimensions that are the same as the dimensions of the snapshot cube, merging the snapshot cube and the profile cube to generate an updated profile cube; and deriving the volume-based calling pattern cubes based on the updated profile cube.

2. A method as in claim 1 further comprising:

storing the updated profile cube into the profile table in the data warehouse; and performing data staging between the profile table and the updated profile cube at predetermined time intervals.

3. A method as in claim 1 wherein said profile cube, snapshot cube, and updated profile cube each includes at least two dimensions and at least two levels.

4. A method as in claim 3 further comprising:

analyzing the calling pattern cube by utilizing at least one OLAP operation along more than one level.

5. A method as in claim 3 further comprising:

analyzing the calling pattern cube by utilizing at least one OLAP operation along more than one dimension.

6. A method as in claim 1 wherein the profile cube, snapshot cube, and the updated profile cube each are multi-level and multi-dimensional cubes.

7. A method as in claim 1 wherein the profile table and the call table each has a plurality of attributes, and the profile cube and snapshot cube each has a plurality of dimensions, said attributes corresponding in a one-to-one fashion to the dimensions.

8. A method as in claim 1 wherein the profile cube includes at least one cell having probability based values.

9. A method for detecting telecommunication fraud performed in a data processing system having a data warehouse and an OLAP server, the method comprising:

retrieving a plurality of call records from the data warehouse;

generating a calling profile cube based on the call records; wherein the calling profile cube includes information on multiple customers;

generating a volume-based calling pattern cube for each individual customer based on the multi-customer calling profile cube;

comparing the volume-based calling pattern cube for each customer to a predetermined fraudulent volume-based calling pattern; and when the volume-based calling pattern cube is in a first predetermined relationship with predetermined fraudulent volume-based calling patten, performing a first action, wherein performing a first action includes one of:

flagging a particular caller with the volume-based calling pattern being analyzed as suspicious;

automatically generating an alert that specifies callers with suspicious volume-based calling pattern;

performing further investigation on callers with suspicious volume-based calling pattern;

cancellation of telephone services for callers with suspicious volume-based calling pattern; and performing other appropriate remedial actions.

10. A data processing system comprising:

a data warehouse for storing data in a relational format, said data warehouse including a profile table and a call table;

an OLAP server, coupled to the data warehouse, for providing predetermined OLAP operations;

a profile engine, coupled to the data warehouse for computing, maintaining and utilizing caller pattern cubes that represent caller profiles; wherein the caller pattern cubes can be utilized to detect telecommunication fraud; and a fraud detection module for detecting telecommunication fraud by comparing known fraudulent profiles to caller pattern cubes;

the profile engine further generating a profile cube from information selected from the profile table, generating a snapshot cube, updating the profile cube by merging the profile cube and the snapshot cube to generate an updated profile cube, and deriving a calling pattern cube based on the updated profile cube; wherein the profile engine is a scalable computation engine that is implemented by OLAP programming supported by the OLAP server.

11. A method for detecting telecommunication fraud performed in a data processing system having a data warehouse and an OLAP server, the method comprising:

retrieving a plurality of call records from the data warehouse;

generating a calling profile cube based on the call records; wherein the calling profile cube includes information on multiple customers;

generating a volume-based calling pattern cube for each individual customer based on the multi-customer calling profile cube;

generating a probability-based calling pattern cube based on the volume-based calling pattern cube for each individual customer;

comparing the probability-based calling pattern cube for each customer to a predetermined fraudulent probability-based calling pattern;

when the probability-based calling pattern cube is in a first predetermined relationship with predetermined fraudulent probability-based calling pattern, performing a first action, wherein performing a first action includes one of:

flagging a particular caller with the probability-based calling pattern being analyzed as suspicious;

automatically generating an alert that specifies callers with suspicious probability-based calling pattern;

performing further investigation on callers with suspicious probability-based calling pattern;

cancellation of telephone services for callers with suspicious probability-based calling pattern; and performing other appropriate remedial actions.

12. The method of claim 11 wherein the probability-based calling patterns enables one of the analysis and comparison of a first probability-based calling patterns that covers a first time period with a second probability-based calling patterns that covers a second time period.

* * * * *

UNITED STATES PATENT AND TRADEMARK OFFICE
CERTIFICATE OF CORRECTION

PATENT NO. : 6,917,940 B1  
APPLICATION NO. : 09/523446  
DATED : July 12, 2005  
INVENTOR(S) : Qiming Chen et al.

Page 1 of 1

It is certified that error appears in the above-identified patent and that said Letters Patent is hereby corrected as shown below:

In column 14, line 50, in Claim 1, delete "procesing" and insert -- processing --, therefor.

In column 14, line 55, in Claim 1, delete "record;" and insert -- records; --, therefor.

In column 14, line 57, in Claim 1, delete "multipe" and insert -- multiple --, therefor.

In column 15, line 13, in Claim 1, delete "cube," and insert -- cube; --, therefor.

In column 15, line 59, in Claim 9, delete "patten" and insert -- pattern --, therefor.

In column 15, line 64, in Claim 9, delete "specifles" and insert -- specifies --, therefor.

Signed and Sealed this

Fourth Day of May, 2010

David J. Kappos  
*Director of the United States Patent and Trademark Office*